(12) United States Patent
Cabouillet et al.

(10) Patent No.: US 9,657,417 B2
(45) Date of Patent: May 23, 2017

(54) ELONGATE SELF-CLOSING SLEEVE FOR PROTECTING ELONGATE MEMBERS HAVING IMPROVED SOUND DAMPENING QUALITY

(71) Applicants: DELFINGEN FR-ANTEUIL, Anteuil (FR); Asheboro Elastics Corporation, Asheboro, NC (US)

(72) Inventors: Anne-Sophie Cabouillet, Besancon (FR); Matthew Paul Welshans, Denton, NC (US)

(73) Assignees: DELFINGEN FR-ANTEUIL, Anteuil (FR); ASHEBORO ELASTICS CORPORATION, Asheboro, NC (US)

( * ) Notice: Subject to any disclaimer, the term of this patent is extended or adjusted under 35 U.S.C. 154(b) by 380 days.

(21) Appl. No.: 14/207,769

(22) Filed: Mar. 13, 2014

(65) Prior Publication Data

US 2014/0272224 A1   Sep. 18, 2014

Related U.S. Application Data

(60) Provisional application No. 61/789,897, filed on Mar. 15, 2013.

(51) Int. Cl.
 *D04B 21/14*   (2006.01)
 *D04H 1/52*   (2006.01)
 (Continued)

(52) U.S. Cl.
 CPC ......... *D04B 21/205* (2013.01); *D03D 1/0035* (2013.01); *D04B 21/16* (2013.01);
 (Continued)

(58) Field of Classification Search
 CPC ...... D04B 21/14; D04B 21/16; D04B 21/165; D04B 21/202; D04H 1/52
 (Continued)

(56) References Cited

U.S. PATENT DOCUMENTS 4,929,478 A   5/1990   Conaghan et al.
4,955,116 A   9/1990   Hayamizu et al.
(Continued)

FOREIGN PATENT DOCUMENTS

EP   1236822 A1   9/2002
EP   1746324 A1   1/2007
(Continued)

OTHER PUBLICATIONS

Spencer, David J. Knitting Technology: Third Edition. Woodhead Publishing Limited, Cambridge England. 2001. pp. 375-376.*
(Continued)

*Primary Examiner* — Jenna Johnson
(74) *Attorney, Agent, or Firm* — MH2 Technology Law Group, LLP

(57) ABSTRACT

The present disclosure concerns an elongate self-closing sleeve for protecting elongate members, said sleeve having internal and external opposite faces wherein said sleeve comprises a sound dampening textile substrate and a warp knitted textile stitched to said textile substrate. Said sound dampening textile substrate and said warp knitted textile having first and second longitudinal opposite free edges biased toward each other in order to define an internal space wherein said elongate member could be placed therein, and wherein said warp knitted textile comprises at least one first monofilament yarn that forms laying-in stitches and that is in plastic material(s).

20 Claims, 4 Drawing Sheets

(51) Int. Cl.
  *D04B 21/20* (2006.01)
  *D03D 1/00* (2006.01)
  *D06C 7/02* (2006.01)
  *D04B 21/16* (2006.01)
  *H02G 3/04* (2006.01)

(52) U.S. Cl.
  CPC ................ *D04H 1/52* (2013.01); *D06C 7/02* (2013.01); *H02G 3/0481* (2013.01); *D10B 2403/0311* (2013.01); *D10B 2505/12* (2013.01); *Y10T 428/1362* (2015.01)

(58) Field of Classification Search
  USPC ..................... 442/366, 369; 112/429, 438
  See application file for complete search history.

(56) References Cited

U.S. PATENT DOCUMENTS

| | | | |
|---|---|---|---|
| 6,854,298 B2 | 2/2005 | Relats et al. | |
| 6,963,031 B2 | 11/2005 | Gladfelter et al. | |
| 6,978,643 B2 | 12/2005 | Akers et al. | |
| 7,216,678 B2 | 5/2007 | Baer | |
| 7,395,680 B2 | 7/2008 | Baer et al. | |
| 7,523,532 B2 | 4/2009 | Yamaguchi et al. | |
| 7,690,225 B2 | 4/2010 | Relats et al. | |
| 7,754,301 B2 | 7/2010 | Yamaguchi et al. | |
| 8,557,073 B2 | 10/2013 | Relats et al. | |
| 8,557,358 B1 | 10/2013 | Hennings et al. | |
| 9,347,158 B2 | 5/2016 | Cabouillet et al. | |
| 2004/0231789 A1* | 11/2004 | Blackmore | E03F 3/06 156/294 |
| 2005/0124249 A1 | 6/2005 | Uribarri | |
| 2007/0163305 A1* | 7/2007 | Baer | D04B 21/16 66/171 |
| 2010/0108171 A1 | 5/2010 | Relats Manent et al. | |
| 2011/0209601 A1 | 9/2011 | Relats Casas et al. | |
| 2012/0328810 A1 | 12/2012 | Relats Casas et al. | |
| 2013/0220104 A1 | 8/2013 | Relats Casas et al. | |
| 2015/0176162 A1 | 6/2015 | Relats Manent et al. | |

FOREIGN PATENT DOCUMENTS

| | | |
|---|---|---|
| EP | 1775811 A1 | 4/2007 |
| EP | 2597739 A1 | 5/2013 |
| WO | 2007/076530 A2 | 7/2007 |
| WO | 2008/070819 A2 | 6/2008 |
| WO | 2009/010599 A1 | 1/2009 |
| WO | 2011/128484 A1 | 10/2011 |
| WO | 2012/078833 A1 | 6/2012 |
| WO | 2014/140207 A1 | 9/2014 |

OTHER PUBLICATIONS

International Search Report mailed Sep. 3, 2014, International Application No. PCT/EP2014/055008, pp. 1-4.

* cited by examiner

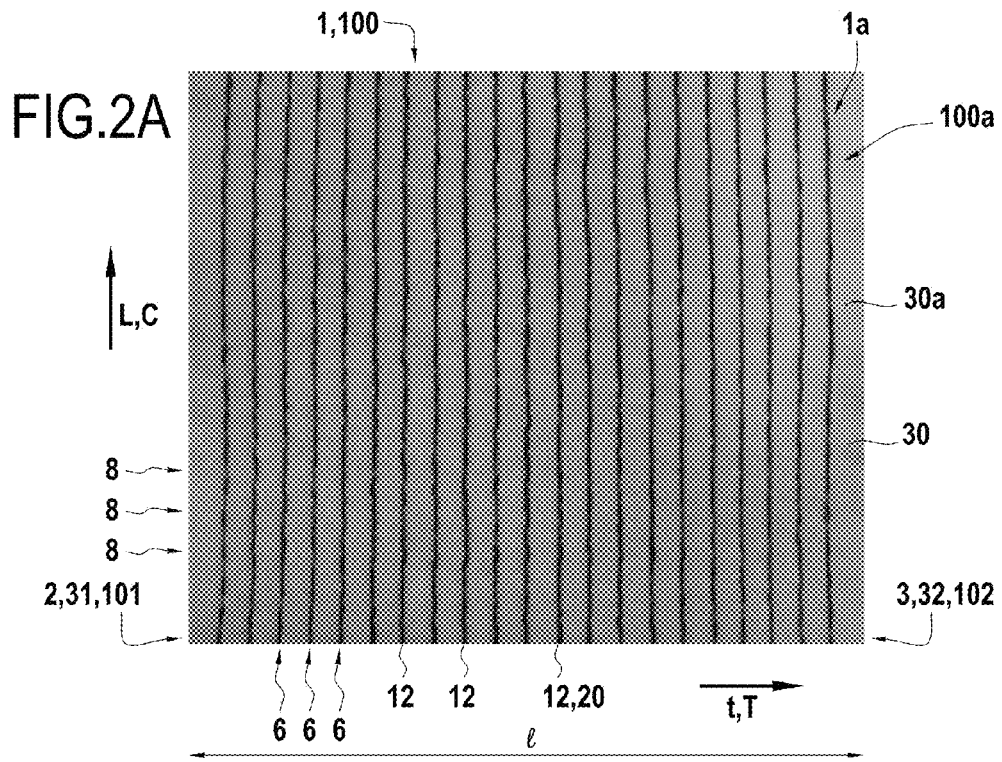
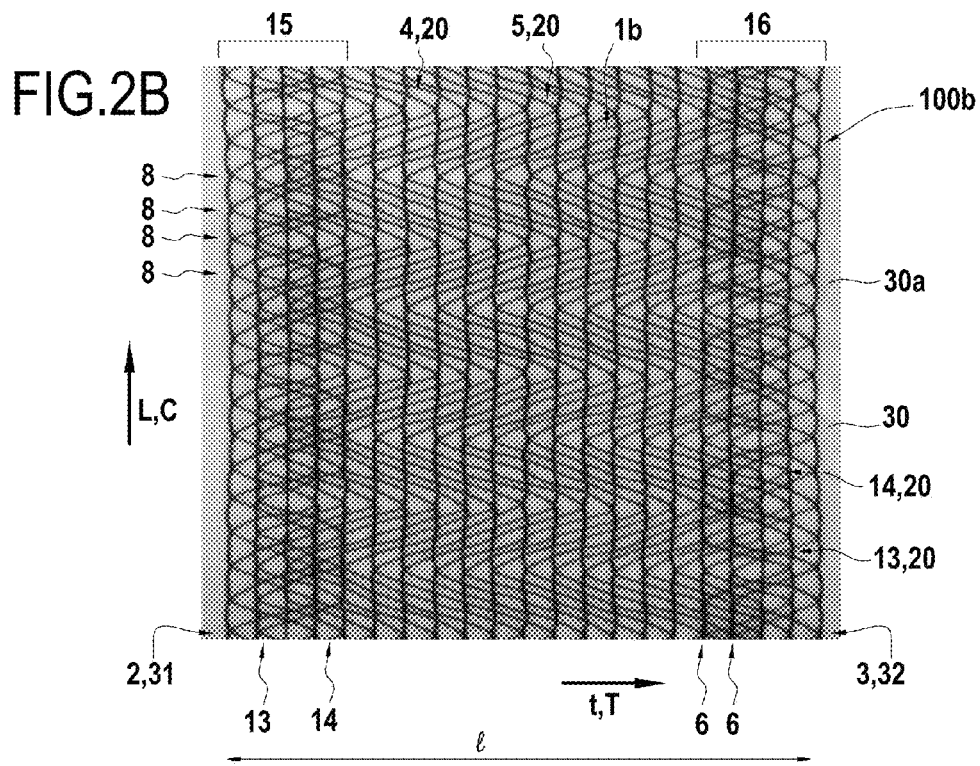

ELONGATE SELF-CLOSING SLEEVE FOR PROTECTING ELONGATE MEMBERS HAVING IMPROVED SOUND DAMPENING QUALITY

The present patent application claims priority to U.S. Provisional Patent Application No. 61/789,897, filed Mar. 15, 2013, and entitled "Textile with Sound Damp Quality," the entire contents of which are herein incorporated by reference.

TECHNICAL FIELD

The present disclosure concerns the technical field of elongate self-closing sleeves for protecting elongate members, especially for protecting cables such as wiring harness, electrical cables and optical fibers, in the aeronautic, marine, railway and automotive industry. The present disclosure concerns more particularly a self-closing sleeve having improved sound dampening quality.

BACKGROUND OF THE DISCLOSURE

Protective sleeves that are longitudinally opened are known to be used for surrounding elongated members and protect them from cuts, abrasion, radiant heat, vibrations, induced wear and other harsh environmental threats. The vibrations can lead to wear of the elongate members and, consequently of the sleeve itself. Such protective sleeves are also known for routing elongate members.

Besides this, such protective sleeves are used to absorb the noise arising from vibrations between cables, especially in automotive industry.

Protective sleeves that are longitudinally opened make easier their placement around cables to be protected. These protective sleeves, even though are longitudinally opened, are elastic in their behaviour and return back to their tubular shape automatically when they are in the rest position. These longitudinally opened sleeves are also known as "wrap-around" sleeve.

When positioning within protective sleeve, the wiring or cables are also held together in a neat bundle, allowing a multiplicity of different items to be handled as sub-assembly, thus saving time and effort during integration of the items into their environment.

Protective sleeves may be made by weaving or knitting yarns into a weaved or knitted textile and then resiliently biasing the two longitudinal opposite free edges of said textile toward each other in order to impart a tubular form to the textile and to define an internal space for receiving elongate members. Biasing may be effected by heating the yarns under the final shape that is sought after. For example, biasing may be effected by heating the yarns when the textile is wrapped around a cylindrical mandrel or is placed in tubular form inside a tube, wherein the yarns take on a permanent set confirming to the shape of the mandrel or to the shape of the internal volume of the tube. The textile is then cooled down still wrapped around said mandrel or in tubular form inside said tube. This thermo-forming step may be performed only if the sleeve comprises a monofilament yarn in a plastic material. This thermo-forming step imparts a shape memory or elastic memory to the textile and therefore to the sleeve. The textile used during this thermo-forming step is in the form of a strip in order to form a sleeve that has a longitudinally axis and a transverse axis, the length of the strip being higher than its width. The sleeve is heated at a temperature that is generally close to the glass transition temperature or the softening point of said plastic material(s). One example of a thermo-forming step is described in U.S. Pat. No. 4,929,478, the description of which is incorporated herein by reference.

Besides this, when considering acoustical dampening materials and protective coverings, for example for use in automobiles, weight, thickness and expense are often limiting factors. With such reductions in automobile size, weight and thickness of parts, higher expectations as to the performance of the interior compartments, and inclusion of more electronic parts and wiring, selecting the most efficient, yet economical, acoustic isolation materials has become even more important. However, reaching certain sound reduction expectations with a sound reducer that is easy to manipulate and durable enough to withstand use in harsh environments remains a challenge. Various woven, knitted and non-woven materials have been considered for such use. Applicants have found that identifying sound reduction materials that are easy to manipulate and durable, as well as beneficial for other factors, for example minimizing abrasion resistance remains challenging.

In the automobile industry, for example, wiring is known to create undesirable excess noise. In efforts to reduce such noise, automobile wiring is traditionally wrapped with sound inhibiting tape. Additionally, wovens and non-wovens have been wrapped around the wiring to reduce noise levels transmitted through the frame and body of the car into the interior car compartment. However, Applicants realize that there are many challenges associated with these applications for acoustical dampening.

In one example, a nonwoven such as felt has been wrapped around automotive electrical wiring to protect the wiring or reduce the sound resulting from the vibrations occurring in automobiles. Tape is often used to wrap around the felt surrounding the wiring to secure the felt in place. In situations such as these, however, the felt and tape application has a number of disadvantages. By way of example, the felt may display undesirable wearing due to the abrasion and temperatures to which it is exposed. Additionally, the felt does not easily fold around the wiring and/or other automotive parts, and furthermore, securing the felt with the tape is cumbersome, time consuming and labor intensive. Improvements have been attempted to alleviate the need for holding a wrapping, such as the felt, in place on the wiring; however, such improvements like adding fasteners can add unacceptable expense. Also, the external automotive environment can often be extreme with heat and durability being factors in the usefulness and sustainability of materials when applied in such an environment. Often, when a wrapping is used to protect automotive wiring, the wrapping does not offer desirable sound reduction qualities and when wrapping with sound dampening is used, it is often not acceptably abrasion resistant.

SUMMARY OF THE DISCLOSURE

The current disclosure is directed, according to a first aspect, to apparatus, systems and methods for an improved textile strip and/or sleeve including a stitched resilient yarn. In many the items here after described, a textile substrate and a resilient yarn will be combined to form a textile strip for protection and sound dampening, a thermo-formed textile strip, and/or an acoustic isolation sleeve. In operation, embodiments of the disclosure can be used to encase contents for protection and to efficiently and durably minimize unwanted sounds in places such as, for example, an automobile passenger compartment. The textile strip and/or sleeve may also be structured to reduce electromagnetic interference, improve abrasion resistance and improve thermal and reflective properties.

Therefore, the present disclosure concerns an improved textile with sound dampening quality which refers to the following items:

Item 1. A textile strip for sound dampening comprising:
a sound dampening textile substrate, and
a resilient yarn stitched to the textile substrate,
wherein the resilient yarn is stitched in a pattern that is repeated longitudinally on the substrate in a weft direction, the pattern including at least one course of an overlapping diagonal traverse of the yarn between the stitches.

Item 2. The textile strip of item 1, wherein when the strip is thermoformed, differential properties of the textile substrate and the resilient yarn maintain a curvature, allowing the textile strip to take the form of a sleeve.

Item 3. The textile strip of item 1 wherein the resilient yarn is a monofilament.

Item 4. The textile strip of item 3 wherein the monofilament is in the range of 0.1 mm to 0.5 mm.

Item 5. The textile strip of item 1 wherein the strip has a first longitudinal free edge and a second longitudinal free edge and the first and second edges each include a selvedge.

Item 6. The textile strip of item 5 wherein the selvedge is a monofilament stitched in a warp direction and the monofilament is within the range of about 0.1 mm to 0.5 mm.

Item 7. The textile strip of item 1 wherein the resilient yarn is a multifilament.

Item 8. The textile strip of item 7 wherein the multifilament is within the range of about 50 dtex to 2,000 dtex.

Item 9. The textile strip of item 5 wherein the selvedge is a multifilament stitched in a warp direction and is within the range of about 50 dtex to 2,000 dtex.

Item 10. The textile strip of item 1 wherein the textile substrate is selected from a non-woven fabric, a knitted fabric and a woven fabric.

Item 11. The textile strip of item 1 wherein the pattern includes at least a second course of an overlapping diagonal traverse of the yarn between the stitches.

Item 12. The textile strip of item 11 wherein the pattern includes a first weft insertion and a second weft bar insertion.

Item 13. A textile strip for sound dampening capable of being formed into a tubular body defining an access opening, the textile strip comprising:
a flexible textile substrate having a length and a width, and
a knitted pattern bound to the substrate and formed with a resilient yarn, wherein the pattern includes at least:
a first two bar weft insertion, and
a second two bar weft insertion, wherein the first insertion and the second insertion overlap for at least 2 wales in at least 2 courses of the structure.

Item 14. The textile strip of item 13 wherein the overlap of the first insertion and the second insertion do not converge for more than one wale in one course.

Item 15. The textile strip of item 13 wherein the overlap of the first and second insertion forms an angle of between 1 degree and 179 degrees.

Item 16. The textile strip of item 13 including a first longitudinal free edge and a second longitudinal free edge.

Item 17. The textile strip of item 16 wherein the substrate includes a top and a bottom.

Item 18. The textile strip of item 17 wherein thermoforming the textile strip biases the first edge and the second edge of the strip toward each other and shapes the strip into the form of a resilient tubular body.

Item 19. The textile strip of item 17 wherein the pattern is knitted to the substrate on the bottom.

Item 20. The textile strip of item 13 wherein the textile substrate is selected from a non-woven fabric, a knitted fabric and a woven fabric.

Item 21. A thermo-treated textile sleeve comprising:
a textile substrate having a first longitudinal free edge and a second longitudinal free edge,
a resilient yarn applied to the substrate in a lengthwise direction to form a knitted textile strip,
wherein thermo-treating the strip biases the first edge and the second edge of the substrate toward each other creating a curved textile sleeve, and
wherein the resilient yarn maintains a spring bias toward each other of the first edge and the second edge to define an opening within the thermo-treated curved textile sleeve.

Item 22. The sleeve of item 21 wherein the textile substrate is selected from a non-woven fabric, a knitted fabric and a woven fabric.

Item 23. The sleeve of item 22 wherein the yarn is a monofilament having a diameter in the range of about 0.1 mm to 0.5 mm.

Item 24. The sleeve of item 21 wherein the resilient yarn is a multifilament having a denier between about 70 d and about 1200 d.

Item 25. The sleeve of item 22 wherein the sleeve has an acoustic sound reduction of about 5 decibels or greater.

Item 26. An acoustic isolation sleeve comprising:
a tubular body defining an access slit and being biased to a closed position, wherein the tubular body is formed from a textile strip comprising,
a flexible textile substrate,
a knitted pattern, bound to the substrate, having a plurality of insertions of a resilient yarn, wherein the pattern includes at least:
a first two bar weft insertion, and
a second two bar weft insertion, wherein the first insertion and the second insertion adjacently overlap for at least 2 wales in at least 2 courses of the structure, thereby creating a reinforced surface on the textile strip that is oriented in the warp direction,
whereby thermoforming the reinforced surface biases a first longitudinal free edge and a second longitudinal free edge of the tubular body toward each other toward the closed position.

Item 27. The sleeve of item 26. wherein the textile substrate has a weight in the range of 50 g/m$^2$ to 400 g/m$^2$.

Item 28. The sleeve of item 26, wherein the textile substrate has a weight in the range of 10 g/m$^2$ to 500 g/m$^2$.

Item 29. The sleeve of item 26, wherein the textile strip has an improved sound damp value in the range of 5 dB to 50 dB as determined by an acoustic isolation test.

Item 30. The sleeve of item 26, wherein the sleeve includes at least one of the following additional properties: an electromagnetic interference property having a value in the range of 20 dB to 80 dB as determined by IEC 62153-4-3 Tria-Axial with a frequency range of 150 KHz to 150 MHz; an abrasion resistance property having a value in the range of 1,000 Cycles to 500,000 Cycles as determined by SAE ARP 1536A; and a thermal and a reflective property having a value in the range of 10° C. to 200° C. as determined by SAE J2302 (Parameters distance 25 mm & Temperature 538° Q.

Item 31. The sleeve of item 26 wherein the sleeve includes at least two of the following additional qualities: an electromagnetic interference property having a value in the range of 20 dB to 80 dB as determined by IEC 62153-4-3 Tria-Axial with a frequency range of 150 KHz to 150 MHz; an abrasion resistance property having a value in the range of 1,000 Cycles to 500,000 Cycles as determined by SAE ARP 1536A; and a thermal and a reflective property having a value in the range of 10° C. to 200° C. as determined by SAE J2302 (Parameters distance 25 mm & Temperature 538° Q.

Item 32. The sleeve of item 26, wherein the textile substrate includes at least a portion chosen from at least one of a nonwoven fabric, a knitted fabric, and a woven fabric.

Item 33. The sleeve of item 32, wherein the resilient yarn is a monofilament.

Item 34. The sleeve of item 26, wherein the resilient yarn includes at least one yarn chosen from a polyester yarn having a denier in the range of 70 d to 1200 d; an aramid yarn having a denier in the range of 70 d to 1200 d; a polyaramide yarn having a denier in the range of 70 d to 1200 d; a metallic yarn having a gauge in the range of 36 to 16; a PSS yarn having a denier in the range of 70 d to 1200 d; and a PEEK yarn having a denier in the range of 70 d to 1200 d.

Item 35. The sleeve of item 26, wherein the resilient yarn includes at least one monofilament yarn having a diameter in the range of about 0.04 to about 0.5 mm.

Item 36. The sleeve of item 26, wherein the pattern is a repeating pattern for a substantial length of the sleeve lengthwise.

Item 37. The sleeve of item 26, further including a resin component.

Item 38. The sleeve of item 26 wherein the overlap of the first insertion and the second insertion do not converge for more than one wale in one course.

Item 39. The sleeve of item 26 wherein the overlap of the first and second insertion forms an angle of between 1 degree and 179 degrees.

Item 40. The sleeve of item 26 wherein the substrate includes a top and a bottom.

Item 41. The sleeve of item 40 wherein the pattern is knitted to the substrate on the bottom.

Item 42. A method of forming a textile strip comprising the steps of:
  placing a sound dampening textile substrate on a warp knitting machine,
  knitting a longitudinally repeated pattern onto the substrate using a resilient yarn, the pattern including at least a first stitch and a second stitch creating a substantially diagonal adjacent overlap between the stitches that traverses at least one course and at least one wale,
  creating a reinforced surface on the textile strip by applying the resilient yarn pattern to the substrate.

Item 43. A method of forming a textile strip for sound dampening, capable of being formed into a tubular body defining an access opening, comprising the steps of:
  selecting a sound dampening flexible textile substrate having a length and a width,
  knitting a resilient yarn to the substrate, and
  creating a pattern with the resilient yarn, wherein the pattern includes at least:
  a first two bar weft insertion,
  a second two bar weft insertion,
  an adjacent overlap of the first insertion and the second insertion for at least 2 wales in at least 2 courses of the structure.

Item 44. A method of forming a thermo-treated textile sleeve comprising:
  selecting a sound dampening textile substrate having a first longitudinal free edge and a second longitudinal free edge,
  applying a resilient yarn to the substrate in a lengthwise direction to form a knitted textile strip,
  thermo-treating the strip to bias the first longitudinal free edge and the second longitudinal free edge of the substrate toward each other,
  creating a curved textile sleeve with the thermo-treated strip, and
  memory setting a spring bias toward each other of the first edge and the second edge to define an opening within the thermo-treated curved textile sleeve in which contents can be placed inside the sleeve.

Item 45. A method of forming a textile strip for sound dampening, capable of being formed into a tubular body defining an access opening, comprising the steps of:
  creating a tubular body having an access opening and being biased to a closed position,
  forming the tubular body from a flexible knitted textile strip,
  knitting the textile strip with a resilient yarn,
  creating a pattern with the resilient yarn on the textile strip, the pattern including:
    a first two bar weft insertion, and
    a second two bar weft insertion, wherein the first insertion, and the second insertion adjacently overlap for at least 2 wales in at least 2 courses of the structure, thereby creating a reinforced surface on the textile strip that is oriented in the warp direction, whereby thermoforming the reinforced surface biases a first edge and a second edge of the tubular body toward each other toward the closed position.

Item 46. A method of sound dampening using a textile strip as described in anyone of items 1 to 13.

Item 47. A method of sound dampening using a thermo-treated textile sleeve as defined in anyone of items 14 to 36.

The current disclosure also concerns, according to a second aspect, an elongate self-closing sleeve for protecting at least one elongate member, said sleeve having internal and external opposite faces, said sleeve comprises a sound dampening textile substrate and a warp knitted textile stitched to said sound dampening textile substrate, said sound dampening textile substrate and said warp knitted textile having first and second longitudinal opposite free edges biased toward each other in order to define an internal space configured to receive said at least one elongate member. Said warp knitted textile comprises at least one first monofilament yarn that forms laying-in stitches, the at least one first monofilament yarn comprising a plastic material.

Advantageously, monofilament yarns provide stiffness, and provide strong resilient biasing that maintains each of the warp knitted textile and the sound dampening textile substrate in the self-closing position. The biased monofilaments also tend to restore the sleeve to its tubular shape in the absence of a distorting force, which is generally applied when the sleeve is manipulated to an open state to insert or remove an elongate member.

The technical features describing the protective sleeve in the "background of the disclosure" part may apply to the self-closing sleeve according to the disclosure, especially concerning the thermo-forming step.

The warp knitted textile according to the disclosure comprises wales of stitches designated as wales in the present text and courses of stitches designated as courses in the present text. The wales of stitches and the courses of stitches correspond respectively to the warp direction (C) and to the weft direction (T) of the warp knitted textile.

The transverse axis (t) of the sleeve is perpendicular to the longitudinal axis (L) of the sleeve. The transverse axis (t) of the sleeve corresponds to the weft direction (T) of the warp-knitted textile and the longitudinal axis (L) of the sleeve corresponds to the warp direction (C) of the warp-knitted textile.

The warp knitted textile and the sound dampening textile substrate according to the disclosure are in the form of a flat strip before the thermo-forming step that imparts to the sleeve its self-closing shape. Each one of the warp knitted textile and of the sound dampening textile substrate has a length and a width. The length of the strip is higher than the width of the strip.

The internal faces and the external faces of the warp knitted textile strip and of the sound dampening textile substrate correspond respectively to the internal face and the external face of the self-closing sleeve.

Preferably, the internal faces of the warp knitted textile and of the sound dampening textile substrate face the internal space of the elongate self-closing sleeve whereas the external faces of the warp knitted textile and of the sound dampening textile substrate face outside said sleeve.

In one embodiment, the warp knitted textile comprises a first monofilament yarn and a second monofilament yarn each forming laying-in stitches extending in the same direction between its first and second longitudinal opposite free edges on at least two wales and a third yarn forming chain stitches or tricot stitches, each of said first and second yarns comprising at least one plastic material.

It has been observed that during the thermo-forming step, monofilament yarns in plastic material(s) shrink and form loops on the internal face or external face of the sleeve. These loops are unsightly and can be hooked by an elongate member during its insertion within the internal space of the sleeve when the loops are present on the internal face of the sleeve or can be hooked by other items disposed outside the sleeve when the loops are present on the external face of the sleeve. Moreover, these loops can wear the elongate members disposed within the internal space or items disposed outside the sleeve. These loops are even more developed when the sleeve comprises yarn(s) or is knitted on a sound dampening textile substrate in a material that has a thermal behaviour that is different from the thermal behaviour of the plastic material(s) of the monofilaments yarns. The aforesaid loops could also be developed when the warp-knitted textile comprises yarns of different diameters or in different plastic materials.

Advantageously, with the use of two monofilaments yarns in plastic material(s) forming laying-in stitches extending in the same direction in a repeated manner between the two longitudinal free edges of the sleeve along the longitudinal axis of the sleeve, the knitting pattern of the warp knitted textile is well-balanced and provides enough biasing force to monofilaments structure to form a self-closing sleeve with a good closure.

Therefore, the formation of loops during the thermo-forming step described here above is limited or suppressed, even when using a sound dampening textile substrate that has a thermal behaviour different from the thermal behaviour of the first and second yarns.

We understand, according to the disclosure, by the fact that the first yarn and the second yarn form laying-in stitches extending in the same direction that the laying-in stitches of the first and second yarns are not in opposition. The laying-in stitches of said first and second yarns are consecutives in the weft direction between first and second opposite free edges of the warp knitted textile.

The first yarn, and optionally the second yarn, may form laying-in stitches that extend in a repeated manner in the weft direction (T) between said two longitudinal free edges along all the width of the warp knitted textile in strip form.

The chain stitches or tricot stitches form loops which can be closed or opened.

The chain stitches form loops that extend on one wale (or one needle) whereas the tricot stitches form loops that extend on at least two wales (or two needles).

The warp-knitted textile may be knitted on a Rachel knitting machine or a crochet-type knitting machine.

The first and second longitudinal opposite free edges of the warp-knitted textile overlap each other or are in contact defining a circular cross-section for the sleeve.

According to the disclosure, by the term "laying-in stitches on at least two wales", we understand that the laying-in stitches are formed on at least two needles.

Preferably, the first yarn and the second yarn form laying-in stitches on at most ten needles, more preferably on at most eight needles, particularly on at most six needles, and more particularly on at most four needles.

The third yarn forms chain stitches or tricot stitches that extend in the warp direction along the longitudinal axis of the sleeve, preferably on all the width of the warp knitted textile.

The third yarn provides dimensional stability to the warp knitted textile in the warp direction.

In one embodiment, the first yarn and/or the second yarn and/or the third yarn can be in the same plastic material or in different plastic materials, more particularly in a plastic material chosen among the following polymers, alone or combined: polyamide 6-6, polyamide 4-6, polyamide 6, polyamide 12, polyethylene terephthalate, polypropylene, polyetherketone (PEK), polyetheretherketone (PEEK), polyphenylene sulphide (PPS), polyethylene, polyvinyl chloride (PVC), polyurethane, polyvinylidene fluoride (PVDF), ethylene tetrafluoroethylene (ETFE), fluoropolymers such as NEOFLON EFEP sold by Daikin or HYFLON PFA or MFA sold by Solvay, poly(tetrafluoroethylene) (PTFE); polyoxymethylene (POM), polybutylene terephthalate (PBT), poly(p-phenylene benzobisoxazole) (PBO).

The third yarn could also be in a material selected in the following list, optionally in combination with a plastic material here above described: meta-aramid, para-aramid, or in cotton.

The third yarn may be chosen in the list that consists of: a monofilament yarn, a multifilament yarn and a staple fiber yarn.

In one embodiment, the first yarn and the second yarn are also knitted on at least three courses on a same wale and are alternated with each other on said same wale.

The first yarn and the second yarn are knitted on an uneven number of courses on a same wale.

Advantageously, the first yarn and the second yarn impart stability to the warp-knitted textile along the longitudinal axis L of the sleeve. The first and second monofilament yarns are blocked in an alternative way on a same wale by the stitches of the third yarn along the warp direction C. Therefore, after the thermo-forming step has been done, no loop is formed since no portion of the first and second monofilaments protrudes from the internal face or the external face of the sleeve. The first and second yarns are held in the warp direction C by the stitches of the third yarn.

Preferably, the first yarn and the second yarn are knitted on at most nine courses on a same wale, more preferably on at most seven courses on a same wale, particularly on at most five courses on a same wale, and more particularly on three courses on a same wale.

In one embodiment, the first yarn, and optionally the second yarn, overlap(s) at least two courses in the weft direction between two neighbouring wales when said first, and optionally second, yarn(s) extend(s) on at least two wales.

Advantageously, the first yarn, and optionally the second yarn, extend(s) diagonally between two neighbouring wales, more particularly in a direction (M) that forms an angle α with the transverse axis (t) of the sleeve. Even more particularly, the angle α is higher than or equal to 20°, and preferably less than or equal to 90°, more preferably less than or equal to 70°.

According to the disclosure, we understand by "two wales are neighbours" that said two wales are disposed side by side (or are adjacent) in the weft direction of the warp knitted textile.

This feature helps to reduce the tendency of the sleeve to form loops after the thermo-forming step.

When a yarn forms laying-in stitches on at least two wales and extends between two neighbouring wales in overlapping only one course, the angle α is close to 0°.

In one embodiment, the warp knitted textile comprises at least a fourth monofilament yarn, and optionally a fifth monofilament yarn, that form(s) laying-in stitches in opposition to the laying-in stitches formed by each of the first yarn and the second yarn.

The fourth yarn, and optionally the fifth yarn, improve(s) the resiliency and the biaising force of the sleeve after the thermo-forming step and therefore improve(s) the self-closure ability of the sleeve.

The fourth yarn, and optionally the fifth yarn, may form laying-in stitches that extend in a repeated manner in the weft direction (T) between said two longitudinal free edges, particularly along all the width of the strip. The aforesaid embodiment is preferred when stiffness is sought after for the sleeve, especially when the sleeve comprises yarn(s) that could not be thermoformed.

The fourth yarn, and optionally the fifth yarn, may also form laying-in stitches that extend in the weft direction (T) in a repeated manner in one or several determined zones that is/are disposed between the two longitudinal free edges of the sleeve.

The fourth yarn and/or the fifth yarn may be in the same plastic material or in different plastic materials, more particularly in a plastic material chosen among the following polymers, alone or combined: polyamide 6-6, polyamide 4-6, polyamide 6, polyamide 12, polyethylene terephthalate, polypropylene, polyetherketone (PEK), polyetheretherketone (PEEK), polyphenylene sulphide (PPS), polyethylene, polyvinyl chloride (PVC), polyurethane, polyvinylidene fluoride (PVDF), ethylene tetrafluoroethylene (ETFE), fluoropolymers such as NEOFLON EFEP sold by Daikin or HYFLON PFA or MFA sold by Solvay, poly(tetrafluoroethylene) (PTFE); polyoxymethylene (POM), polybutylene terephtalate (PBT), poly(p-phenylene benzobisoxazole) (PBO).

In one embodiment, the fourth monofilament yarn, and optionally the fifth monofilament yarn, form(s) laying-in stitches in a first zone and in a second zone, the first zone is in proximity to the first longitudinal free edge of the warp knitted textile and the second zone is in proximity to the second longitudinal free edge of the warp knitted textile.

The fourth yarn, and optionally the fifth yarn, is/are present only in these two zones to impart stiffness to the two longitudinal free edges of the sleeve and thus helping said free edges to be in contact or to overlap each other in order to perfectly close the internal space of the sleeve.

In one embodiment, the fourth yarn, and optionally the fifth yarn, is/are also knitted on at least three courses on a same wale.

In one sub-embodiment, the fourth yarn and the fifth yarn are alternated with each other on a same wale.

The first yarn, and optionally the fifth yarn, is/are knitted on an uneven number of courses on a same wale.

The technical effects described here above concerning the first and second yarns also apply in this embodiment.

Preferably, the fourth yarn, and optionally the fifth yarn, is/are knitted on at most nine courses on a same wale, more preferably on at most seven courses on a same wale, particularly on at most five courses on a same wale and more particularly on three courses on a same wale.

In one embodiment, the fourth yarn, and optionally the fifth yarn, overlap(s) at least two courses in the weft direction between two neighbouring wales when said yarn(s) extend(s) on at least two wales.

Advantageously, the fourth yarn, and optionally the fifth yarn, extend(s) diagonally between two neighbouring wales, more particularly in a direction (P) that forms an angle α" with the transverse axis (t) of the sleeve. Even more particularly, the angle α" is higher than or equal to 20°, and preferably less than or equal to 90°, more preferably less than or equal to 70°.

This feature helps to reduce the tendency of the sleeve to form loops after the thermo-forming step.

In one embodiment, the third yarn is a multifilament yarn, having a fineness which is higher than or equal to 70 deniers and less than or equal to 1200 deniers.

In one embodiment, the first and/or second and/or fourth and/or fifth monofilament(s) yarn(s) has/have a diameter that is higher than or equal to 0.10 mm and less than or equal to 0.50 mm, preferably higher than or equal to 0.20 mm and less than or equal to 0.40 mm.

In one embodiment, the sleeve comprises an electromagnetic film or coating on its external face.

Electromagnetic protection is sought when an electrical current passes through the elongate members.

In one embodiment, the sleeve comprises a reflective foil or a reflective coating on its external face, for example a foil in aluminium.

Preferably, the reflective foil is a metallized foil, especially a foil in a plastic material according to the disclosure, such as poly(ethylene terephtalate), covered by a thin film in aluminium.

This reflective foil or coating reflects the heat (especially infra-red rays) and protect from heat the elongate members disposed within the internal space of the sleeve.

This reflective foil may comprise one face covered by an adhesive in order to be stick on the external face of the sleeve, for example in its self-closing configuration, therefore after the thermo-forming step.

According to the disclosure, the reflective or electromagnetic coating comprises at least one polymer, said polymer may be chosen from PVC (polyvinyl chloride), PET (polyethylene terephtalate), PU (polyurethane), PA (polyamide(s)) or any other material known in the art that complies with end uses of the sleeve, and at least one filler, said filler is selected to impart electromagnetic and/or reflective properties.

A coating or a foil may be both electromagnetic and reflective.

Preferably said filler is selected among: stainless steel such as AISI 316 or 316L or 304, aluminium, copper, nickel plated copper, tinned copper, titanium dioxide, preferably these elements are in powder form.

In one embodiment, the textile substrate is selected from a nonwoven fabric, a knitted fabric and a woven fabric.

Preferably, the nonwoven fabric is a carded web, which could be bonded or non-bonded. The aforesaid carded web may be bonded by needle punching and/or by melting carded thermofusible fibers, when said nonwoven comprises such thermofusible fibers.

The nonwoven fabric could be a spunbond nonwoven or a spunmelt nonwoven (like SMS, SMMS, . . . )

In one embodiment, the textile substrate has a weight in the range of 10 $g/m^2$ to 500 $g/m^2$, more particularly in the range of 50 $g/m^2$ to 400 $g/m^2$.

In one embodiment, the first yarn and/or the second yarn, and/or the third yarn and/or the fourth yarn and/or the fifth yarn are chosen from: a polyester yarn having a denier in the range of 70 d to 1200 d; an aramid yarn having a denier in the range of 70 d to 1200 d; a polyaramide yarn having a denier in the range of 70 d to 1200 d; a metallic yarn having a gauge in the range of 36 to 16; a PSS yarn having a denier in the range of 70 d to 1200 d; and a PEEK yarn having a denier in the range of 70 d to 1200 d. In one embodiment, the first yarn and/or the second yarn, and/or the third yarn and/or the fourth yarn and/or the fifth yarn are monofilament yarn having a diameter in the range of about 0.04 to about 0.5 mm.

In one embodiment, the self-closing sleeve comprises a resin component.

In one embodiment, the first yarn and the second yarn, and optionally the fourth yarn and/or the fifth yarn, form laying-in stitches on the internal face of the self-closing sleeve.

In one embodiment, the third yarn forms chain stitches or tricot stitches on the external face of the self-closing sleeve.

The present disclosure concerns according to a third aspect a method for producing a self-closing sleeve having internal and external opposite faces comprising:
  placing a sound dampening textile substrate on a warp knitting machine, the substrate having first and second longitudinal free edges,
  knitting a warp knitted textile onto said sound dampening textile substrate, said warp knitted textile comprising a first monofilament yarn that forms laying-in stitches, the first monofilament yarn comprising a plastic material, said warp knitted textile having first and second longitudinal opposite free edges,
  thermo-forming the sound dampening textile substrate onto which the said warp knitted textile has been knitted in order to bias the first and second longitudinal free opposite edges of both the sound dampening textile substrate and the warp knitted textile in order to impart a tubular shape to the assembly and form said elongate self-closing sleeve.

In one embodiment, the warp knitted textile presents the features here above described concerning the disclosure according to a second aspect.

In one embodiment, the current disclosure is directed to a textile strip for sound dampening including a sound dampening textile substrate and a resilient yarn stitched to the textile substrate. The resilient yarn is stitched in a pattern that is repeated longitudinally on the substrate in a weft direction. The pattern includes at least one course of an overlapping diagonal traverse of the yarn between the stitches.

In another embodiment, a textile strip for sound dampening is capable of being formed into a tubular body defining an access opening. The textile strip includes a flexible textile substrate having a length and a width and a knitted pattern bound to the substrate and formed with a resilient yarn. The pattern includes at least a first two bar weft insertion and a second two bar weft insertion. The first insertion and the second insertion overlap for at least 2 wales in at least 2 courses of the structure.

Also disclosed is a thermo-treated textile sleeve including a textile substrate having a first longitudinal free edge and a second longitudinal free edge and a resilient yarn applied to the substrate in a lengthwise direction to form a knitted textile strip. Thermo-treating the strip biases the first edge and the second edge of the substrate toward each other creating a curved textile sleeve. The resilient yarn maintains a spring bias toward each other of the first edge and the second edge to define an opening within the thermo-treated curved textile sleeve.

In another embodiment, an acoustic isolation sleeve includes a tubular body defining an access slit and being biased to a closed position. The tubular body is formed from a textile strip including a flexible textile substrate and a knitted pattern bound to the substrate. The knitted pattern includes a plurality of insertions of a resilient yarn, and includes at least, a first two bar weft insertion and a second two bar weft insertion. The first insertion and the second insertion adjacently overlap for at least 2 wales in at least 2 courses of the structure, creating a reinforced surface on the textile strip that is oriented in the warp direction. Thermo-forming the reinforced surface biases a first edge and a second edge of the tubular body toward each other toward the closed position.

The disclosure is also directed to a method of forming a textile strip including the steps of: placing a sound dampening textile substrate on a warp knitting machine, knitting a longitudinally repeated pattern onto the substrate using a resilient yarn, the pattern including at least a first stitch and a second stitch creating a substantially diagonal adjacent overlap between the stitches that traverses at least one course and at least one wale, and creating a reinforced surface on the textile strip by applying the resilient yarn pattern to the substrate.

Disclosed also is a method of forming a textile strip for sound dampening, capable of being formed into a tubular body defining an access opening, including the steps of: selecting a sound dampening flexible textile substrate having a length and a width, knitting a resilient yarn to the substrate and creating a pattern with the resilient yarn. The pattern includes at least a first two bar weft insertion, a second two bar weft insertion and an adjacent overlap of the first insertion and the second insertion for at least 2 wales in at least 2 courses of the structure.

In another example, a method of forming a thermo-treated textile sleeve includes: selecting a sound dampening textile substrate having a first longitudinal free edge and a second longitudinal free edge, applying a resilient yarn to the substrate in a lengthwise direction to form a knitted textile strip, thermo-treating the strip to bias the first edge and the second edge of the substrate toward each other, creating a curved textile sleeve with the thermo-treated strip, and memory setting a spring bias toward each other of the first edge and the second edge to define an opening within the thermo-treated curved textile sleeve in which contents can be placed inside the sleeve.

Other examples include a method of forming a textile strip for sound dampening, capable of being formed into a tubular body defining an access opening, including the steps of: creating a tubular body having an access opening and being biased to a closed position, forming the tubular body from a flexible knitted textile strip, knitting the textile strip with a resilient yarn, and creating a pattern with the resilient yarn on the textile strip. The pattern includes a first two bar weft insertion and a second two bar weft insertion. The first insertion and the second insertion adjacently overlap for at least 2 wales in at least 2 courses of the structure, creating a reinforced surface on the textile strip that is oriented in the warp direction. Thermoforming the reinforced surface biases a first longitudinal edge and a second longitudinal edge of the tubular body toward each other toward the closed position.

A method of sound dampening using a textile strip as described in items 1-14 is also disclosed. Additionally, a method of sound dampening is disclosed using a thermo-treated textile sleeve as described in items 15-37. Generally, the disclosure is also directed to a method of sound dampening using a textile strip and/or sleeve as described herein.

The above summary was intended to summarize certain embodiments of the disclosure. Systems and methods will be set forth in more detail, along with examples demonstrating efficacy, in the figures and detailed description below. It will be apparent, however, that the detailed description is not intended to limit the present disclosure.

BRIEF DESCRIPTION OF THE EXAMPLES

FIG. 2A is top view of the external face of the warp knitted textile knitted according to the knitting pattern represented in FIG. 1, said warp knitted textile being knitted on a sound dampening textile substrate.

FIG. 2B is a top view of the internal face of the warp knitted textile knitted according to the knitting pattern represented in FIG. 1, said warp knitted textile is knitted on a sound dampening textile substrate.

DETAILED DESCRIPTION OF EXEMPLARY EMBODIMENTS

Referring now to the examples in general, and FIGS. 1, 2A, 2B and 3 specifically, one example of a sound dampening textile strip, generally designated 100, and a sound dampening sleeve, generally designated 40, are shown. Systems, apparatuses and methods may vary from example to example but they may often include a sound dampening textile substrate and a monofilament yarn stitched to the textile substrate forming a textile strip, and additionally, thermo-treated to form a self-closing sleeve.

Applicants discovered in a series of research and development testing, that stitch bonding a resilient monofilament yarn pattern in the textile substrate could not only increase the abrasion resistance of a textile strip, but could also increase the acoustical dampening capacity of the strip. However, in achieving such results, it was difficult to maintain other desirable characteristics, such as a consistently smooth yarn pattern after thermoforming the strip into a sleeve.

Various textile strips were exposed to heat to shrink the knitted substrate through a thermoform process in order to further shape the knitted substrate into a desired geometry. Applicants discovered that the addition of the yarn to the substrate provided a desired rigidity and strength to the substrate for durability, and through research and testing was able to eventually reach improved acoustic and abrasion resistance results as well.

Applicants realized that there was not an existing recipe for successfully combining an acoustical substrate with a resilient monofilament yarn to produce a sound dampening textile that had adequate durability and practicality. Originally, Applicants began with a substrate cut to a predetermined width with a moderate thickness and nominal amount of bicomponent fibers.

Several variables were recognized that could affect the knitted substrate, such as, the amount of shrinkage to occur as the substrate was to be fed under tension into a knitting machine, stitch formation and the amount of shrinkage to occur during thermoforming.

In order to account for these variables and to develop a textile strip for sound dampening, a nonwoven substrate with desired acoustical properties was knitted in a continuous lengthways direction with a monofilament yarn applied in the weft direction with multiple weft insertion patterns. Of concern was that the nonwoven was able to maintain an acceptable range of testing results, including, tubular shape, rigidity, strength and memory, after the knitted nonwoven was exposed to the thermoforming process. A series of research and development testing occurred in order to achieve a resilient monofilament yarn knitted textile strip demonstrating acceptable results upon thermo-treatment.

Figure 4:
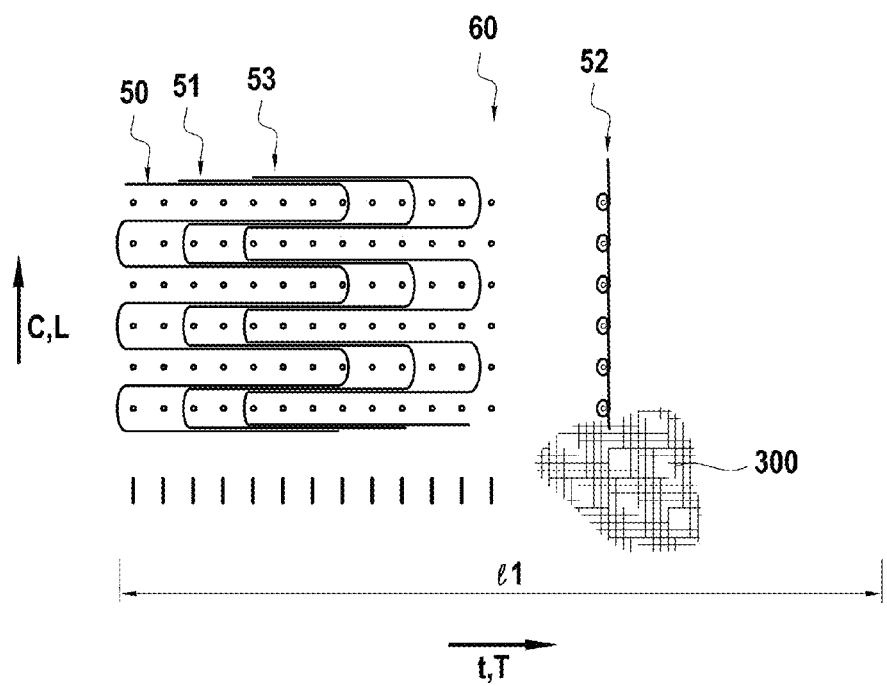
FIG. 4 represents partially another example of a knitting pattern of the warp knitted textile according to the disclosure.

In one example, to prepare the knitting machine for applying a monofilament to a nonwoven, the knitting needles were placed in the knitting machine to allow a centered and even spacing across the width of the tensioned non-woven. Space was allowed for a small selvedge on each edge to allow for a soft edge of the finished product. A one weft bar movement over eight needles in a traverse direction was used for the monofilament weft movement. Applicants used multiple thread guides for the monofilament placed on the same weft insertion bar across the width of the non-woven to allow for an overlapping of the monofilament, as seen in FIG. 4. The added selvedge included multifilament warp yarns added in a simple closed loop form. Subsequently, the knitted non-woven was thermoformed into a closed tubular sleeve including a longitudinal access slit.

From this sample, Applicant discovered that the monofilament and the non-woven could have very different shrinkage values from the heat from the thermoforming process and that shrinkage may be incompatible between the substrate and the yarn, for example, as tested here, the non-woven and the monofilament. The non-woven was discovered to act as insulation to the monofilament during the process. As a result, the monofilament was able to slip inside the stitch formation making unwanted excess loops in the inside of the tubular formed shell. Such looping could interfere with the ability of the tubular shell to surround its intended contents adequately to protect the contents and to retain the sound dampening abilities.

This thermoformed textile strip not only experienced monofilament looping issues after thermoforming due to inconsistencies between monofilament and nonwoven shrinkage but also failed to fit within acceptable tolerance ranges for heat aging and abrasion resistance testing on the sleeve. Applicant realized that the nonwoven and resilient yarn characteristics, as well as the pattern in which the resilient yarn is applied to the substrate, combine in the knitted non-woven thermoformed sleeve in unexpected ways to give the thermoformed sleeve its own unique set of characteristics and affected whether the thermoformed strip achieves acceptable heat ageing, acoustic dampening and abrasion resistance levels.

The nonwoven weight was adjusted to address the lack of abrasion resistance. The pattern of the monofilament was adjusted to reduce the shrinkage, slippage and looping issues. A selvedge was further developed and tested to maintain a soft edge on the sleeve but that still had enough durability. The weight of the nonwoven was lowered and the textile substrate was cut smaller to accommodate for more suitable stretch and tension of the nonwoven to allow better punch through of needles.

Experimentation and Testing

Heat Aging/Shape Retention Testing: tubular shape retention of the sleeve was evaluated by heat aging testing where a thermoformed textile strip was exposed to temperatures of around 150° C. to 175° C. for around 240 hours mimicking temperatures experienced in automobiles around the motor area. Additional evaluation was made at around 125° C. to 150° C. for around 3,000 hours mimicking temperatures reached in the passenger compartment and non-motor areas of a vehicle.

Abrasion Resistance Testing: abrasion resistance was evaluated by SAE ARP 1536 A methods.

Acoustic Insulation Testing: acoustic insulation characteristics were evaluated by measuring the absorbing/silencing effect that textile samples demonstrate in eliminating rattling and vibration noises. The test was designed to produce qualitative data for the silencing effect and is appropriate, for example, in instances such as on materials used for vehicle sound reduction.

Generally, a steel bar was dropped onto an aluminum plate (thickness 0.3 mm) from a height of 20 mm, exerting a force of 1.16 N. The noise is measured by a microphone positioned 50 mm over the impact location. The noise is measured in the form of the sound pressure level (Lsp) with frequency evaluation A and time evaluation S. A single layer of the acoustic insulation material was applied to the steel bar in the area of the impact location over a length of around 5 cm in a longitudinal direction. The measure is the difference between the noise of the bar wrapped with the self-closing sleeve and the unwrapped bar. The measuring unit is (dB). The measurement was performed a minimum of ten times at the same location of the specimen. If a trend towards lower silencing values can be discerned, for example, by compressing the specimen, it is noted in the results report. The testing was conducted in a low noise environment.

Returning to FIG. 1, the sound dampening textile substrate 30 may be a non-woven fabric, a knitted fabric and/or a woven fabric. The substrate typically is cut to a predetermined width with a moderate thickness and may include a nominal amount of bicomponent fibers. The substrate 30 may include an external face 30a and an internal face 30b and first 31 and second 32 longitudinal opposite free edges.

In one example, a non-woven substrate may have a basis weight of about 60 g/m² to about 400 g/m². Typically, a non-woven is a textile made from fibers bonded together randomly by chemical, mechanical, heat and/or solvent treatment. A binder may or may not be included. The non-woven may, for example, be a plastics material, such as formed from a polyester and/or a polyethylene terephthalate (PET) and/or polypropylene (PP). Alternatively, the non-woven may be formed of fiberglass or aramid fibers.

The first resilient yarn 20 may be, for example, a monofilament and/or a multifilament. In one example, a monofilament may have a diameter in the range of about 0.1 mm to 0.5 mm. The monofilament may be a plastic material, such as from polyester or alternatively may be formed of PET, PPS and/or from PEEK. The multifilament may, for example, have a denier in the range of about 70 d to about 1200 d. The multifilament may be formed of a plastics material, such as from polyester, PET yarns, PPS yarns, PEEK yarns, metallic yarns, aramid and/or polyaramid yarns. Typically, the resilient yarn is knitted to substrate through a crochet-type machine, for example a weft knitting machine.

Figure 1:
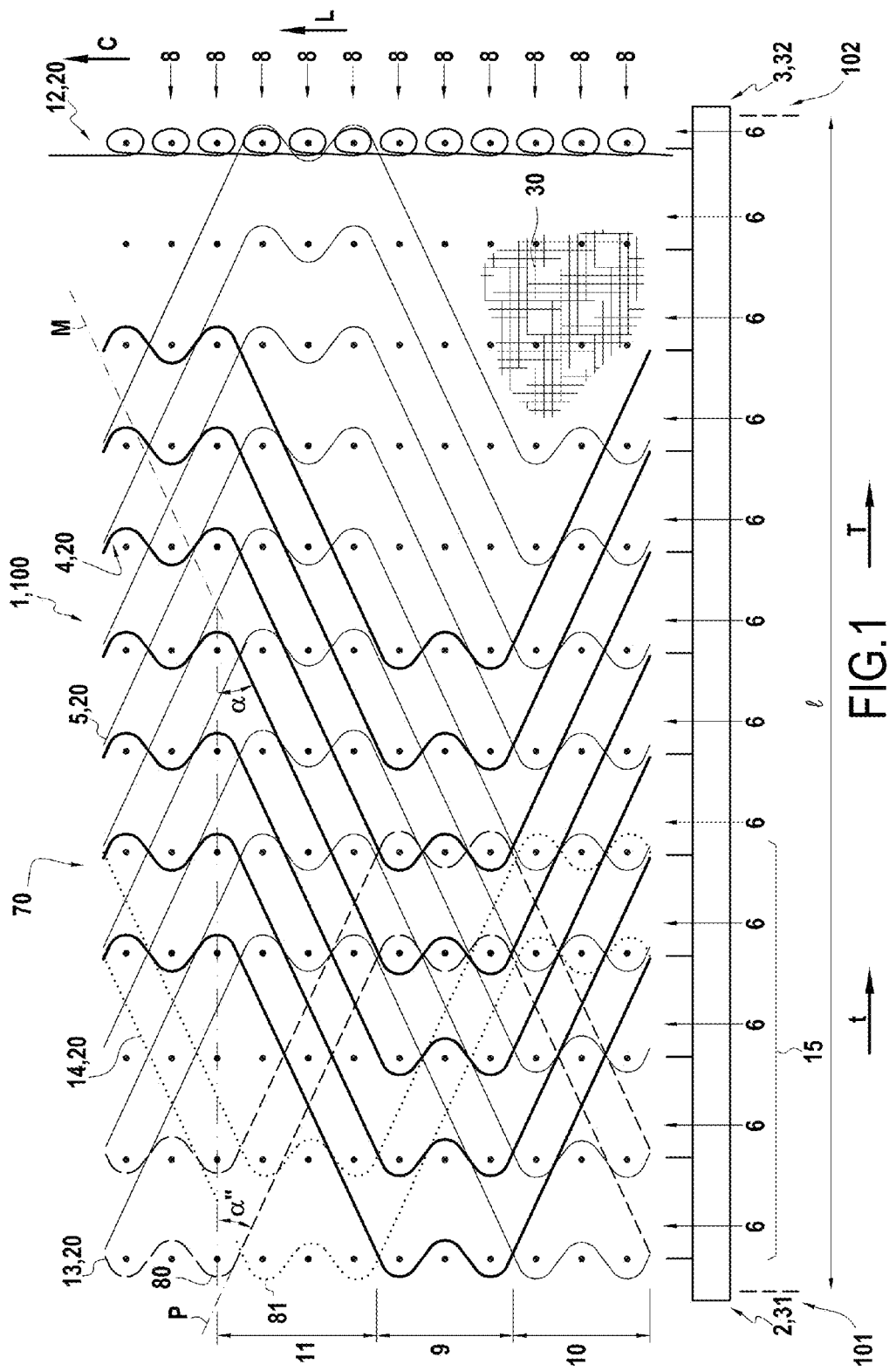
FIG. 1 represents an example of a knitting pattern of the warp knitted textile according to the disclosure in strip form.

FIG. 1 shows a knitting pattern 70 of a warp knitted textile 1 having first 2 and second 3 longitudinal opposite free edges, said warp knitted textile comprises a first monofilament yarn 4 and a second monofilament yarn 5 each forming laying-in stitches extending in the same direction between said free edges 2, 3 on at least two wales 6, said first 4 and second 5 yarns are in plastic material(s). In this example, the first 4 and second 5 monofilaments extend on four wales 6 (or four needles) and form laying-in stitches that are consecutive and not in opposition. The warp knitted textile 1 has a warp direction (C) corresponding to the longitudinal (L) axis of the sound dampening self-closing sleeve 40 and a weft direction (T) corresponding to the transverse axis (t) of said sleeve 40. The warp-knitted textile 1 and the sound dampening textile substrate 30 are represented in a planar configuration in FIGS. 1, 2A and 2B and form an assembly designated as the sound dampening textile strip 10.

The first 4 and second 5 monofilaments form laying-in stitches on a repeated manner between the first 2 and second 3 longitudinal free edges on all the width (l) of the warp knitted textile 1.

In this particular example, the first yarn 4 and the second yarn 5 are knitted on at least three courses 8 on a same wale 6 and are alternated with each other on said same wale 6 such as on intervals 9 and 10. More particularly, the first yarn 4 and the second yarn 5 are knitted on uneven number of courses 8, particularly three courses 8, on a same wale 6.

The first yarn 4 and the second yarn 5 overlap at least two courses 8 in the weft direction (T) between two neighbouring wales 6 when said yarns 4, 5 extend on at least two wales 6, for example overlap two courses 8 in the weft direction (T) between two neighbouring wales 6 when said yarns 4, 5 extend on four wales such as on interval 11.

Thanks to this feature, the first yarn 4 and the second yarn 5 extend diagonally between two neighbouring wales 6 in a direction (M) that forms an angle α with the transverse axis (t) of the sleeve 40, said angle α being higher or equal to 20°.

The warp knitted textile 1 comprises also a third yarn 12 forming chain stitches or tricot stitches extending in a warp direction (C), particularly forming closed chain stitches on FIG. 1. Only one wale of chain stitches has been represented on FIG. 1 for the sake of clarity but the warp knitted textile 1 comprises several wales of closed chain stitches on all the width I of the warp knitted textile 1 formed by the third yarn 12 as represented in FIG. 2A. The third yarn 12 may be a multifilament yarn having a fineness which is comprised between 70 deniers and 1200 deniers. The third yarn 12 may be in a plastic material, such as polyethylene terephthalate or PEEK or PPS.

Moreover, the warp knitted textile 1 comprises a fourth monofilament yarn 13 and a fifth monofilament yarn 14, each forming laying-in stitches that are in opposition to the laying-in stitches formed by each of the first 4 and second 5 yarns in a first zone 15 and in a second zone 16. The first zone 15 is in proximity to the first longitudinal free edge 2 and the second zone 16 is in proximity to the second longitudinal free edge 3.

The fourth 13 yarn and the fifth 14 yarn are also knitted on at least three courses 8, in this example on three courses 8, on a same wale 6 and are alternated with each other on said same wale 8. In one embodiment that is not represented in figures, the fourth 13 and second 14 yarns may also extend in a repeated manner on all the width I of the warp knitted textile 1.

The fourth yarn 13 and the fifth yarn 14 overlap at least two courses 8 in the weft direction (T) between two neighbouring wales 6 when said yarns 13, 14 extend on at least two wales 6.

Therefore, the fourth yarn 13 and the fifth yarn 14 extend diagonally between two neighbouring wales 6 in a direction (P) that forms an angle α" with the transverse axis (t) of the sleeve 40, said angle α" being higher or equal to 20°.

For the sake of clarity, the knitting pattern is partially represented in FIG. 1: the second zone 16 is not represented and the first 4 and second 5 yarns are not represented in a repeated manner on all the width I of the warp knitted textile 1.

As represented in FIGS. 2A and 2B, the warp knitted textile 1 is knitted on the sound dampening substrate 30. The third yarns 12 are disposed on the external face 1a of the warp knitted textile 1 and on the external face 30a of the sound dampening substrate 30. The internal face 1b of the warp knitted textile 1 and the internal face 30b of the sound dampening substrate are covered by the first 4, second 5, fourth 13 and fifth 15 yarns that form laying-in stitches.

For example, the first 4, second 5, fourth 13 and fifth 14 monofilament yarns have a diameter that is comprised between 0.10 mm and 0.50 mm, preferably between 0.20 mm and 0.50 mm, more preferably between 0.20 mm and 0.40 mm.

As it can be seen on FIG. 2B, the first 4 and second 5 monofilament yarns extend on all the width (I) of the warp knitted textile 1.

The fourth 13 and fifth 14 monofilament yarns extend only in the first 15 and second 16 zones that are disposed in proximity respectively to the first 2,31 and second 3,32 opposite free edges of said warp knitted textile 1 and sound dampening substrate 30.

The assembly comprised of the warp knitted textile strip 1 knitted on the sound dampening substrate 30 is placed in a wrapped configuration into a tube in position wherein the first 2,31 and second 3,32 longitudinal opposite free edges are in contact or overlap each other, and is submitted to a temperature that is comprised between 80° C. to 200° C., for example between 120° C. and 180° C., during a time that is comprised between five minutes and twenty minutes. The sound dampening textile strip 100, still in said wrapped configuration, is then cooled, during for example five minutes to thirty minutes. After this thermo-forming step, the sound dampening textile strip 100 is extracted from the tube and has a tubular shape corresponding to the shape of the self-closing sleeve 40 represented in FIG. 3.

The internal faces 1b,30b and the external faces 1a,30a of the warp knitted textile 1 and sound dampening substrate 30 correspond respectively to the internal face 40b and the external face 40a of the self-closing sleeve 40. The first 2,31 and second 3,32 longitudinal opposite free edges overlap each other and define an internal space 19 configured to receive at least one elongate member, such as cables.

The assembly resulting from the combination of a sound dampening textile substrate 30 and a warp knitted textile 1, namely sound dampening textile strip 100, has been tested through the samples 3 and 4 here after described.

Figure 5:
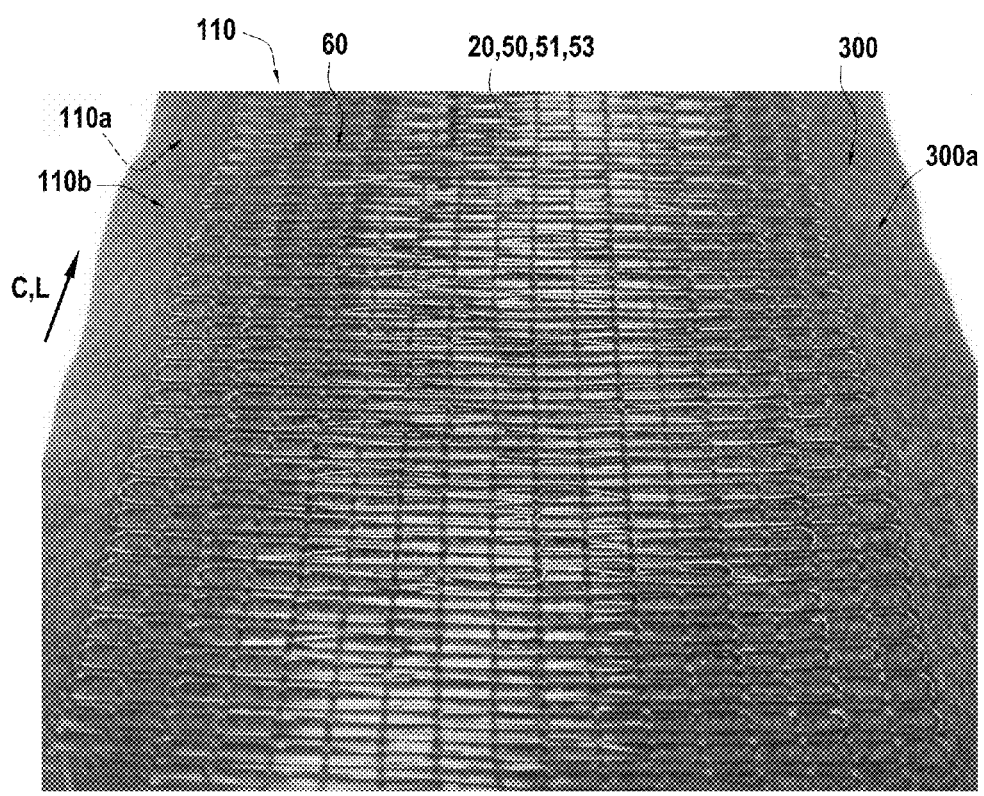
FIG. 5 is a top view of the internal face of the warp knitted textile knitted according to the knitting pattern represented in FIG. 4, said warp knitted textile being knitted on a sound dampening textile substrate.

FIG. 4 represents another example of a knitting pattern according to the disclosure wherein the warp knitted textile 60 comprises a first 50, a second 51, a third 52 and a fourth 53 yarns that are respectively the same than the first 4, second 5, third 12 and fourth 13 yarns represented in FIGS. 1, 2A and 2B. The warp knitted textile 60 represented in FIGS. 4 and 5 is different from the warp knitted textile 1 in that the first 50, second 51 and fourth 53 yarns form laying-in stitches that extend on eight wales or needles on all the width (I1) of the warp knitted textile 60. The laying-in stitches formed by the first ISO, second 51 and fourth 53 yarns are shifted each two wales. Moreover, the first 50, second 51 and the fourth 53 yarns overlap only one course between two neighboring wales when they extend on eight wales. Therefore, the first 50, second 51 and fourth 53 yarns do not extend diagonally in the weft direction but extend in a parallel to the transverse axis (t). The resulting sound dampening textile strip 110 have been tested through the samples 1 and 2.

Sample 1

The sound dampening textile strip 110 comprises a sound dampening substrate 300 which is a nonwoven of 150 g/m$^2$, and a warp knitted textile 60 with the first 50, second 51 and fourth 53 yarns disposed on the internal face of the corresponding self-closing sleeve, the third yarn 52 being disposed on the external face of said sleeve.

Acoustic Insulation Testing Results: 21.3 dB

Abrasion Resistance Testing Results: Average 37 456 cycles

Sample 2

The sound dampening textile strip 110 comprises a sound dampening substrate 300 which is a nonwoven of 150 g/m$^2$, and a warp knitted textile 60 with the first 50, second 51 and fourth 53 yarns disposed on the external face of the corresponding self-closing sleeve, the third yarn 52 being disposed on the internal face of said sleeve.

Acoustic Insulation Testing Results: 16.7 dB

Abrasion Resistance Testing Results: Average 357 191 cycles

Sample 3

The sound dampening textile strip 100 comprises a sound dampening substrate 30 which is a nonwoven of 150 g/m$^2$, and a warp knitted textile 1 with the first 4, second 5, fourth 13 and fifth 14 yarns disposed on the external face 40a of the sleeve 40, the third yarn 12 being disposed on the internal face 40b of said sleeve 40.

Acoustic Insulation Testing Results: 19.6 dB

Abrasion Resistance Testing Results: Average 22 235 cycles

Sample 4

The sound dampening textile strip 100 comprises a sound dampening substrate 30 which is a nonwoven of 150 g/m$^2$, and a warp knitted textile 1 with the first 4, second 5, fourth 13 and fifth 14 yarns disposed on the internal face 40b of self-closing sleeve 40, the third yarn 12 being disposed on the external face 40b of said sleeve 40.

Acoustic Insulation Testing Results: 15.8 dB
Abrasion Resistance Testing Results: Average 129 232 cycles
Sample 5

The sound dampening textile strip 100 comprises a sound dampening substrate 30 which is a nonwoven of 300 g/m², and a warp knitted textile 1 with the first 4, second 5, fourth 13 and fifth 14 yarns disposed on the internal face 40b of self-closing sleeve 40, the third yarn 12 being disposed on the external face 40b of said sleeve 40.

Acoustic Insulation Testing Results: 22.2 dB
Abrasion Resistance Testing Results: Average 498 238 cycles Acoustic Insulation Testing has yielded results of about 10 dB on some samples. In some examples, an acoustic sound reduction of about 5 decibels or greater has been achieved in the sleeve including a textile substrate knitted with a resilient yarn.

It was found that increasing the weight of a nonwoven used in the strip and tested in a sleeve, did not correspondingly/incrementally increase the acoustic insulation results obtained from strip/sleeve testing accordingly and as would be expected. Acoustic sampling has shown significant acoustic dampening when the textile strip is thermoformed with the textile substrate on the outside of the sleeve. Abrasion sampling has shown significant abrasion resistance when the textile strip is thermoformed with the resilient yarn on the outside of the sleeve. The strip according to the disclosure may be reversibly thermoformed depending on the predominantly desired characteristic, acoustic dampening or abrasion resistance, while still maintaining acceptable performance ratios as to the other characteristic.

FIGS. 1, 2A and 2B show one example of a textile strip for sound dampening 100 including, a sound dampening textile substrate 30 and a resilient yarn 20 stitched to the textile substrate 30. The resilient yarn 20 is stitched in a knitting pattern 70 that is repeated longitudinally L on the substrate 30 in a weft direction T, the pattern including at least one wale 6 of an overlapping diagonal traverse of the yarn between the stitches 80 and 81. The strip 100 may additionally include at least a second course of an overlapping diagonal traverse of the yarn between the stitches. The textile strip 100 may be thermoformed and the differential properties of the textile substrate and the resilient yarn may maintain a curvature in the strip 100, allowing the textile strip 100 to take the form of a sleeve 40. The sound dampening textile strip 100 may include a first longitudinal free edge 101 and a second longitudinal free edge 102 and the first 101 and second 102 edges each may include a selvedge 15,16. The selvedges 15,16 may comprises a monofilament, like the fourth yarn 13 and the fifth yarn 14, stitched in a warp direction (L) and the monofilament within the range of about 0.1 mm to 0.5 mm. The selvedge 15,16 may be a multifilament stitched in a warp direction and within the range of about 50 dtex to 2,000 dtex.

Figure 3:
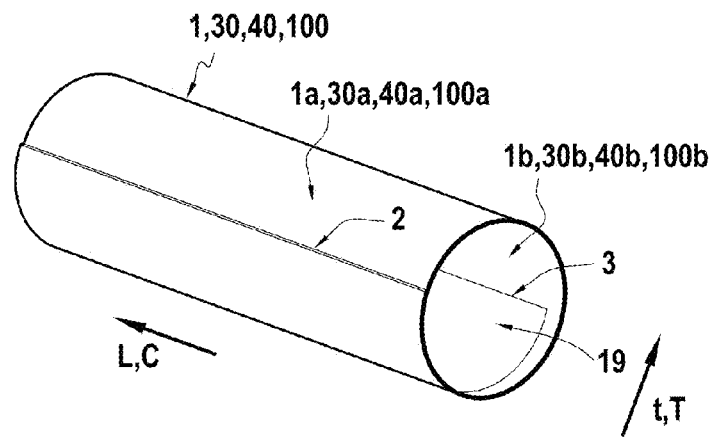
FIG. 3 is as schematic perspective view of a self-closing sleeve having its first and second longitudinal free edges biased toward each other comprising the warp knitted textile and the sound dampening textile substrate represented in FIGS. 2A and 2B.

In another example, a textile strip for sound dampening capable of being formed into a tubular body defining an access opening may include, a flexible textile substrate having a length and a width, and a knitted pattern bound to the substrate and formed with a resilient yarn. The pattern includes at least, a first weft insertion corresponding to the first yarn 4 and a second weft insertion corresponding to second yarn 5. The first and second insertions may be two-bar weft insertions. The first insertion and the second insertion overlap for at least 2 wales 6 in at least 2 courses 8 of the structure. In one example, the first insertion and the second insertion do not converge for more than one wale 6 in one course 8. The textile strip 100 may include a first longitudinal free edge 101, a second longitudinal free edge 102 and an external face 100a and an internal face 100b. The pattern 70 may be knitted to the internal face 100b or alternatively to the external face 100a of the strip 100. The internal face 100b of the strip 100 corresponds to the internal face 40b of the self-closing sleeve 40 as represented in FIG. 3. The external face 100a of the strip 100 corresponds to the external face 40a of the self-closing sleeve 40. Thermoforming the textile strip 100 may bias the first longitudinal free edge 101 and the second longitudinal free edge 102 of the strip 100 toward each other, shaping the strip 100 into the form of a resilient tubular body 40. If the pattern is knitted to the external face 100a of the strip 100, the pattern may end up on the internal face 40b of the tubular sleeve 40 when thermoforming the strip 100 into the sleeve 40. If the pattern is knitted on the internal face 100b of the strip 100, the pattern may end up on the external face 40a of the tubular sleeve 40 when the strip 100 is thermoformed into the sleeve.

Thermoforming uses heat to set a material to a desired geometry, typically by modifying the properties of the material. Generally, thermoforming raises the heat to temperatures at a point either above a material transition point or to a softening point. When the material is cooled, the material retains an elastic memory of the formed shape. While thermoforming is widely recognized by those of skill in the art as a way to set an elastic memory in a material, chemical and/or physical methods may also be used.

The disclosure is also considered a thermo-treated textile sleeve including, a textile substrate having a first longitudinal free edge and a second longitudinal free edge and a resilient yarn applied to the substrate in a lengthwise direction (L) to form a knitted textile strip. Thermo-treating the strip biases the first edge and the second edge of the substrate toward each other creating a curved textile sleeve. The resilient yarn maintains a spring bias toward each other of the first edge and the second edge to define an opening within the thermo-treated curved textile sleeve.

In another example, an acoustic isolation sleeve includes a tubular body defining an access slit and being biased to a closed position. The tubular body is formed from a textile strip including, a flexible textile substrate and a knitted pattern, bound to the substrate. The knitted pattern has a plurality of insertions of a resilient yarn and the pattern includes at least: a first two bar weft insertion and a second two bar weft insertion. The first insertion and the second insertion adjacently overlap for at least 2 wales in at least 2 courses of the structure, thereby creating a reinforced surface on the textile strip that is oriented in the warp direction. Thermoforming the reinforced surface biases the first edge and the second edge of the tubular body toward each other and toward the closed position. In one example, the pattern may be a repeating pattern for a substantial length of the sleeve lengthwise. In another example, the overlap of the first insertion and the second insertion do not converge for more than one wale in one course. The sleeve may additionally include a resin component.

An improved acoustic sleeve may include at least one of the following additional properties: an electromagnetic interference property having a value in the range of 20 dB to 80 dB as determined by IEC 62153-4-3 Tria-Axial with a frequency range of 150 KHz to 150 MHz; an abrasion resistance property having a value in the range of 1,000 Cycles to 500,000 Cycles as determined by SAE ARP 1536A; and a thermal and a reflective property having a value in the range of 10° C. to 200° C. as determined by SAE J2302 (Parameters distance 25 mm & Temperature 538° C.).

The sleeve may also contain more than one of the qualities above.

The disclosure is also directed to a method of forming a textile strip including the steps of: placing a sound dampening textile substrate on a warp knitting machine, knitting a longitudinally repeated pattern onto the substrate using a resilient yarn, the pattern including at least a first stitch and a second stitch creating a substantially diagonal adjacent overlap between the stitches that traverses at least one course and at least one wale, and creating a reinforced surface on the textile strip by applying the resilient yarn pattern to the substrate.

Disclosed also is a method of forming a textile strip for sound dampening, capable of being formed into a tubular body defining an access opening, including the steps of: selecting a sound dampening flexible textile substrate having a length and a width, knitting a resilient yarn to the substrate and creating a pattern with the resilient yarn. The pattern includes at least a first two bar weft insertion, a second two bar weft insertion and an adjacent overlap of the first insertion and the second insertion for at least 2 wales in at least 2 courses of the structure.

In another example, a method of forming a thermo-treated textile sleeve includes: selecting a sound dampening textile substrate having a first longitudinal edge and a second longitudinal edge, applying a resilient yarn to the substrate in a lengthwise direction to form a knitted textile strip, thermo-treating the strip to bias the first edge and the second edge of the substrate toward each other, creating a curved textile sleeve with the thermo-treated strip, and memory setting a spring bias toward each other of the first edge and the second edge to define an opening within the thermo-treated curved textile sleeve in which contents can be placed inside the sleeve.

Other examples include a method of forming a textile strip for sound dampening, capable of being formed into a tubular body defining an access opening, including the steps of: creating a tubular body having an access opening and being biased to a closed position, forming the tubular body from a flexible knitted textile strip, knitting the textile strip with a resilient yarn, and creating a pattern with the resilient yarn on the textile strip. The pattern includes a first two bar weft insertion and a second two bar weft insertion. The first insertion and the second insertion adjacently overlap for at least 2 wales in at least 2 courses of the structure, creating a reinforced surface on the textile strip that is oriented in the warp direction. Thermoforming the reinforced surface biases a first face and a second face of the tubular body toward each other toward the closed position.

A method of sound dampening using a textile strip as described in items 1-13 is also disclosed. Additionally, a method of sound dampening is disclosed using a thermo-treated textile sleeve as described in items 15-36. Generally, the disclosure is also directed to a method of sound dampening using a textile strip and/or sleeve as described herein.

Numerous characteristics and advantages have been set forth in the foregoing description, together with details of structure and function. The disclosure, however, is illustrative only, and changes may be made in detail, especially in matters of shape, size and arrangement of parts, within the principle of the disclosure, to the full extent indicated by the broad general meaning of the terms in which the general claims are expressed. It is further noted that, as used in this specification, the singular forms "a," "an," and "the" include plural referents unless expressly and unequivocally limited to one referent. The use of the term "diagonal" is directional and non-diagonal overlaps are considered within the scope of this disclosure.

The invention claimed is:

1. An elongate self-closing sleeve for protecting at least one elongate member, said sleeve comprising:
   internal and external opposite faces;
   a sound dampening textile substrate; and
   a warp knitted textile that is stitched to said sound dampening textile substrate by being knitted into and through said sound dampening textile substrate, said warp knitted textile comprising wales of stitches and courses of stitches,
   wherein said sound dampening textile substrate and said warp knitted textile have first and second longitudinal opposite free edges biased toward each other in order to define an internal space configured to receive said at least one elongate member, and
   wherein said warp knitted textile comprises at least one first monofilament yarn that forms laying-in stitches, the at least one first monofilament comprising a plastic material.

2. The elongate self-closing sleeve according to claim 1, wherein the warp knitted textile comprises a first monofilament yarn and a second monofilament yarn each forming laying-in stitches extending in the same direction between the first and second longitudinal free edges on at least two wales, each of said first and second yarns comprising at least one plastic material, and wherein the warp knitted textile comprises a third yarn forming chain stitches or tricot stitches.

3. The elongate self-closing sleeve according to claim 2, wherein the first yarn and the second yarn are also knitted on at least three courses on a same wale and are alternated with each other on said same wale.

4. The elongate self-closing sleeve according to claim 2, wherein the first yarn, overlaps at least two courses in the weft direction between two neighbouring wales when said first yarn extends on at least two wales.

5. The elongate self-closing sleeve according to claim 2, wherein the warp knitted textile comprises at least a fourth monofilament yarn that forms laying-in stitches in opposition to the laying-in stitches formed by each of the first yarn and the second yarn.

6. The elongate self-closing sleeve according to claim 5, wherein the fourth monofilament yarn forms laying-in stitches in a first zone and in a second zone, the first zone is in proximity to the first longitudinal free edge and the second zone is in proximity to the second longitudinal free edge.

7. The elongate self-closing sleeve according to claim 5, wherein the fourth yarn is also knitted on at least three courses on a same wale.

8. The elongate self-closing sleeve according to claim 5, wherein the warp knitted textile comprises a fourth monofilament yarn and a fifth monofilament yarn each forming laying-in stitches in opposition to the laying-in stitches formed by each of the first yarn and the second yarn, the fourth yarn and the fifth yarn are knitted on at least three courses on an same wale and are alternated with each other on said same wale.

9. The elongate self-closing sleeve according to claim 5, wherein the fourth yarn overlaps at least two courses in the weft direction between two neighbouring wales when said yarn extends on at least two wales.

10. The elongate self-closing sleeve according to claim 2, wherein, the third yarn is a multifilament yarn, having a fineness which is higher than or equal to 70 deniers and less than or equal to 1200 deniers.

11. The elongate self-closing sleeve according to claim 5, wherein at least one of the first, the second, and the fourth monofilament yarn has a diameter that is higher than or equal to 0.10 mm and less than or equal to 0.50 mm.

12. The elongate self-closing sleeve according to claim 1, wherein the self-closing sleeve comprises an electromagnetic film or coating on its external face.

13. The elongate self-closing sleeve according to claim 1, wherein the self-closing sleeve comprises a reflective foil or a reflective coating on its external face.

14. The elongate self-closing sleeve according to claim 1, wherein the sound dampening textile substrate is selected from a non-woven fabric, a knitted fabric and a woven fabric.

15. The elongate self-closing sleeve according to claim 1, wherein the sound dampening textile substrate has a weight in the range of 10 g/m$^2$ to 500 g/m$^2$.

16. The elongate self-closing sleeve according to claim 1, wherein at least one of the first yarn, the second yarn, the third yarn, and the fourth yarn are chosen from: a polyester yarn having a denier in the range of 70 d to 1200 d; an aramid yarn having a denier in the range of 70 d to 1200 d; a polyaramide yarn having a denier in the range of 70 d to 1200 d; a metallic yarn having a gauge in the range of 36 to 16; a PSS yarn having a denier in the range of 70 d to 1200 d; and a PEEK yarn having a denier in the range of 70 d to 1200 d.

17. The elongate self-closing sleeve according to claim 1, wherein at least one of the first yarn, the second yarn, the third yarn, and the fourth yarn are monofilament yarn having a diameter in the range of about 0.04 mm to about 0.50 mm.

18. The elongate self-closing sleeve according to claim 1, wherein the first yarn and the second yarn form laying-in stitches on the internal face of the self-closing sleeve.

19. The elongate self-closing sleeve according to claim 1, wherein the third yarn forms chain stitches or tricot stitches on the external face of the self-closing sleeve.

20. A method for producing a self-closing sleeve having internal and external opposite faces comprising:
    placing a sound dampening textile substrate on a warp knitting machine, the substrate having first and second longitudinal free edges,
    knitting a warp knitted textile into and through the sound dampening textile substrate, said warp knitted textile comprising wales of stitches and courses of stitches and a first monofilament yarn that forms laying-in stitches, the first monofilament yarn comprising a plastic material, said warp knitted textile having first and second longitudinal free edges, and
    thermo-forming the sound dampening textile substrate onto which the warp knitted textile has been knitted in order to bias the first and the second longitudinal free edges of both the sound dampening textile substrate and the warp knitted textile in order to impart a tubular shape to the assembly and form said self-closing sleeve.

* * * * *